United States Patent
Tabata et al.

[11] Patent Number: 6,011,378
[45] Date of Patent: *Jan. 4, 2000

[54] TRAVELING CONTROL APPARATUS FOR ELECTRIC VEHICLES

[75] Inventors: Kunio Tabata; Minoru Kozaki, both of Suwa, Japan

[73] Assignees: Seiko Epson Corporation; Tokyo R&D Co., both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/056,080

[22] Filed: Apr. 6, 1998

Related U.S. Application Data

[62] Division of application No. 08/537,052, Sep. 29, 1995, Pat. No. 5,771,475.

[30] Foreign Application Priority Data

Sep. 29, 1994 [JP] Japan ................................ 6-235662

[51] Int. Cl.⁷ ............................................... H02P 3/18
[52] U.S. Cl. .......................... 318/759; 318/375; 318/376
[58] Field of Search ........................... 318/362, 364–378, 318/259, 757, 761

[56] References Cited

U.S. PATENT DOCUMENTS

| | | |
|---|---|---|
| 4,217,529 | 8/1980 | Bourke et al. . |
| 4,547,678 | 10/1985 | Metzner et al. . |
| 5,161,634 | 11/1992 | Ichihara et al. . |
| 5,317,669 | 5/1994 | Anderson et al. . |
| 5,412,293 | 5/1995 | Minezawa et al. . |
| 5,528,721 | 6/1996 | Searcy, II et al. . |
| 5,646,852 | 7/1997 | Lorenz et al. . |

*Primary Examiner*—Brian Sircus
*Attorney, Agent, or Firm*—Eric B. Janofsky

[57] ABSTRACT

A control apparatus by which a duty ratio in consideration of how energy stored in storage cells is consumed is set to ensure a steady traveling feeling, a regeneration brake which can produce stable braking forces regardless of how storage cells are consumed, and a protective device by which a plurality of operation stop levels are set to be able to cancel the stop operation effected for the first time and to ensure reliable alarming, are provided. In the first and second embodiments, a chopper duty ratio is compensated depending on how storage cells are consumed, to provide a steady agreeable traveling feeling. In the third embodiment, regenerated electric power is consumed by a motor driving circuit to stabilize operation of a regeneration brake regardless of how storage cells are consumed, and improve performance thereof. In the fourth embodiment, in a protective device for determining an operating condition of equipment, issuing an alarm in the event of abnormality, and stopping operation of the equipment, the stop operation is effected in two steps and a cancel switch for canceling the stop operation in the first step is provided to, depending on the situation, cancel the stop operation effected by the protective device.

5 Claims, 8 Drawing Sheets

| DUTY RATIO (%) | BATTERY TERMINAL VOLTAGE (V) | | | | | |
|---|---|---|---|---|---|---|
| | 30 | 35 | 40 | 45 | 50 | 55 |
| 10 | 0 ~ 7 | 0 ~ 8 | 0 ~ 10 | 0 ~ 11 | 0 ~ 12 | 0 ~ 14 |
| 20 | 8 ~ 15 | 9 ~ 18 | 11 ~ 20 | 12 ~ 23 | 13 ~ 25 | 15 ~ 28 |
| 30 | 16 ~ 23 | 19 ~ 27 | 21 ~ 30 | 24 ~ 34 | 26 ~ 38 | 29 ~ 42 |
| 40 | 24 ~ 25 | 28 ~ 35 | 31 ~ 40 | 35 ~ 45 | 39 ~ 50 | 43 ~ 54 |
| 50 | 26 ~ 37 | 36 ~ 43 | 41 ~ 50 | 46 ~ 56 | 51 ~ 62 | 55 ~ 68 |
| 60 | 38 ~ 45 | 44 ~ 52 | 51 ~ 60 | 57 ~ 68 | 63 ~ 75 | 69 ~ 82 |
| 70 | 46 ~ 53 | 53 ~ 61 | 61 ~ 70 | 69 ~ 79 | 76 ~ 88 | 83 ~ 96 |
| 80 | 54 ~ 60 | 62 ~ 70 | 71 ~ 80 | 80 ~ 89 | 89 ~ 99 | 97 ~ 100 |
| 90 | 61 ~ 68 | 71 ~ 79 | 81 ~ 90 | 90 ~ 100 | 100 | 100 |
| 100 | 69 ~ 100 | 80 ~ 100 | 91 ~ 100 | 100 | 100 | 100 |

FIG._12

TRAVELING CONTROL APPARATUS FOR ELECTRIC VEHICLES

This is a Divisional of prior application Ser. No. 08/537,052 filed on Sep. 29, 1995, now U.S. Pat. No. 5,771,475, contents of which are incorporated herein by reference.

BACKGROUND OF THE INVENTION

1. Field of the Invention

The present invention relates generally to devices for assisting a traveling control apparatus used in electric vehicles. More particularly, the present invention relates to devices for achieving an improvement in overall traveling performance.

2. Description of the Related Art

Recently, attention has been focused on electric vehicles, such as automobiles, powered by electric motors for traveling as next-generation vehicles as substitutes for conventional gasoline vehicles using internal combustion engines. It is expected that electric vehicles powered by clean electric energy can basically solve environmental problems such as detrimental exhaust gas and noise of automobiles. The exhaust gas is said to be responsible for about 70% of air pollution. Moreover, one of the other benefits of electric vehicles is that the life of petroleum resources can be prolonged by at least twice as much.

The electric vehicle typically has road wheels suspended from a vehicle body through shock absorbers. This construction is similar to a conventional automobile. The electric vehicle includes an electric power system comprising a battery power supply made up by a plurality of storage cells, an electric motor for providing rotational energy, a motor driving circuit for controlling rotation of the motor, and a control circuit for instructing control commands to the motor driving circuit. The driving forces generated by the motor is transmitted through a power transmitting apparatus to rotatively drive a road wheel for powering a vehicle in a similar manner as conventional.

Figure 11:
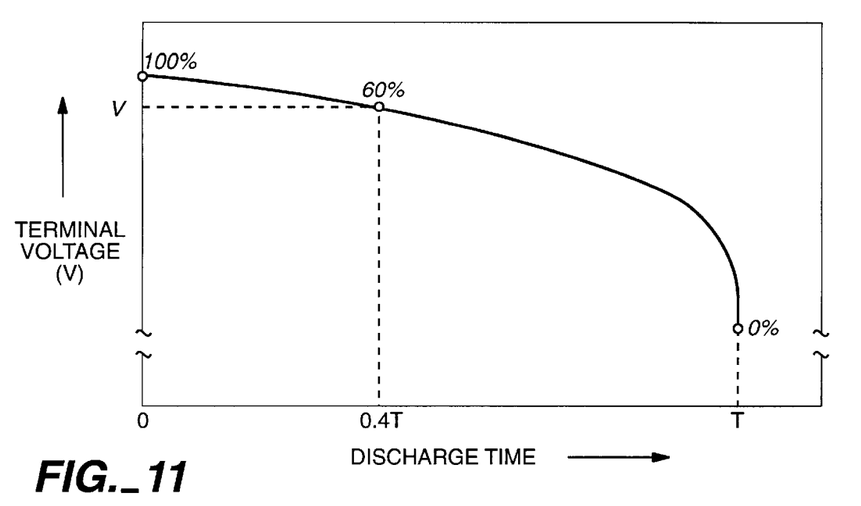
FIG. 11 is a graph showing a typical discharge characteristic of a storage cell when a constant current is discharged.
Figure 12:
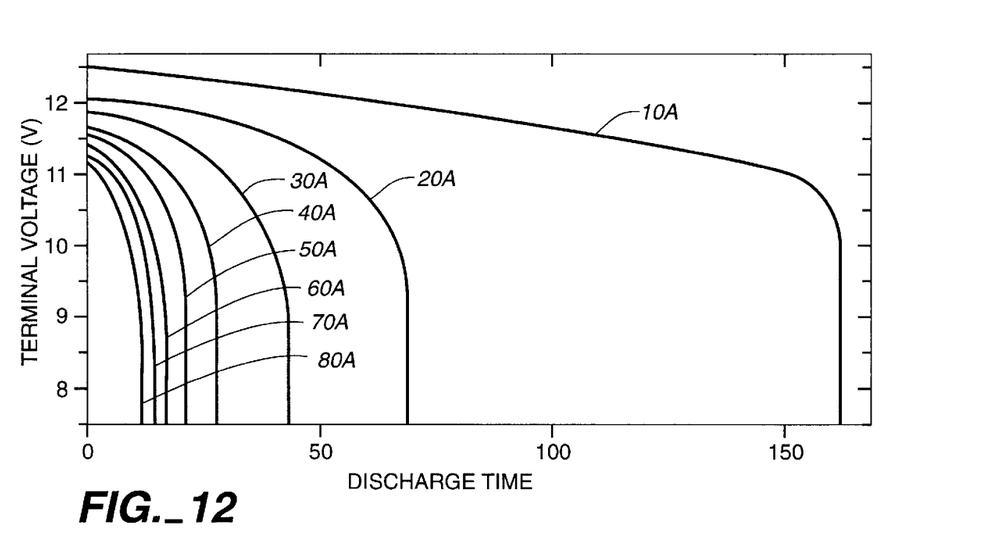
FIG. 12 is a graph showing the relationship between current values discharged from a battery and a chargeable capacity.

The battery power supply for supplying electric power to the electric motor is made up by a plurality of storage cells connected in series so as to provide a required voltage. The storage cells each have a characteristic as follows. With the elapse of time during which the storage cell is discharged in use, the terminal voltage of the battery cell is gradually lowered as shown in a discharge curve in FIG. 11, and then reaches the final voltage at the curve end. When reaching the final voltage, no current must be flown from the storage cell for protection of the storage cell. It is also known that, as shown in FIG. 12, the discharge curve depends on currents supplied in use and changes in the supplied current vary the time during which the storage cell can be discharged continuously. Therefore, an electric vehicle includes a capacity meter for accurately displaying, based on any of various methods, the amount of electric energy remaining in the storage cell while the electric vehicle is in operation.

The electric power from the power supply is supplied through the motor driving circuit which performs chopper control to increase or decrease an effective voltage supplied to the motor for controlling a rotational speed of the motor. A chopper duty ratio for control of the effective voltage is commanded from the control circuit which is electrically connected to an accelerator grip or the like of a manipulation device. In other words, depending on the opening degree of the accelerator set by a driver operating the manipulation device, the control circuit sets a duty ratio for the chopper control and outputs it to the motor driving circuit. Thus, in accordance with an increase or decrease in the opening degree of the accelerator set by the driver, the control circuit sets a duty ratio for the chopper control and, based on this duty ratio, the motor driving circuit increases or decreases the effective voltage supplied to the motor, thereby providing the rotational speed of the motor corresponding to the opening degree of the accelerator.

Further, in place of an engine brake conventionally effected by an internal combustion engine, an electric vehicle generally employs a regeneration brake which is effected by using the electric motor for traveling as a dynamo. The regeneration brake serves as an auxiliary brake such that kinetic energy to be reduced when the electric vehicle decelerates or travels down over a slope, is converted into electric energy by temporarily using the electric motor as a dynamo. Then, it is also customary to charge storage cells with the regenerated electric power for recovery of energy.

Moreover, an electric vehicle is generally loaded with various protective devices for protecting equipment. Specifically, the protective device comprises a sensor provided on each relevant equipment for measuring a temperature, a voltage and so on, and determination means for comparing a sensor value with an evaluation reference level, i.e., an alarm/stop level, and determining the operating condition of the equipment. When the first alarm level is detected, this is determined that the equipment has come close to the limit for use, and an alarm is indicated on a display panel or the like to inform the driver of the determination. When the second stop level is detected, this is judged that the equipment has reached the limit for use, and the operation of the equipment is then stopped.

With motor control practiced in conventional electric automobiles, however, because the chopper duty ratio is set in proportion to the opening degree of the accelerator, there has been a drawback that an accelerating ability of the electric vehicle is different depending on the charge conditions of the storage cells and an acceleration feeling in traveling is unsteady. This is attributable to that although the terminal voltage is lowered with consumption of storage cells, the duty ratio is always set depending on the opening degree of the accelerator regardless of how the storage cells are consumed and, therefore, the effective voltage supplied to the motor is lowered, resulting in differences in the accelerating ability and so on.

Also, with the regeneration brake used in conventional electric automobiles, because the amount of chargeable electric power is varied depending on how storage cells are consumed, there has been a problem that the regenerated electric power can not often recovered to the storage cells, regenerative braking forces are reduced, and safety during traveling of electric automobiles can be impaired. To solve the problem, it has been proposed to introduce any surplus electric power, that cannot be recovered to the storage cells, to a large-sized resistor disposed outside the automobile compartment for generating heat from the resistor so that the generated heat is dissipated to open air for consumption of the surplus electric power. Another alternative is to rotatively chive a flywheel by an electric motor using the regenerated electric power for storing the surplus electric power in the flywheel as mechanical energy. But none of these methods is preferred since the total weight of the vehicle is increased, extra mounting space is required, and the structure is complicated.

Additionally, with the conventional protective device, because the operation of the equipment can still be continued after an alarm has been issued from the protective device, there has been a fear that the driver may continue operating the equipment and the equipment may abruptly be stopped in unwanted situations. This means that when the protective device monitors a temperature condition of the motor, by way of example, the vehicle may stall in a place where it should not be stopped, such as an intersection or a railroad crossing. Further, for a protective device arranged such that the motor operation ability is lowered in the alarm stage, there accompanies a serious risk because the traveling speed is reduced and it takes a time to move away from the improper place.

Moreover, because an alarm issued from the protective device is conventionally indicated on a display panel to inform the driver of the situation, there has been a fear that the driver cannot visually confirm the alarm and cannot recognize it depending on traffic situations in the surroundings and/or running conditions. In electric motorcycles such as scooters, particularly, that tendency is increased from the relationship between the position of the display panel and the range of view of the driver.

OBJECTS OF THE INVENTION

Therefore, it is an object of the present invention to overcome the aforementioned problems.

It is a further object of the present invention to provide a traveling control apparatus by which setting a duty ratio takes in consideration the consumption rate of the storage cells to ensure a steady traveling feeling.

It is an additional object of the present invention to provide a regeneration brake which can produce stable braking forces regardless of how the consumption state of the storage cells.

It is still an additional object of the present invention to provide a protective device by which a plurality of operation stop levels are set so as to be able to cancel the stop operation effected for the first time and to ensure reliable alarming, thereby improving overall traveling performance of electric vehicles.

SUMMARY OF THE INVENTION

According to a first aspect of the present invention, a traveling control apparatus for an electric vehicle comprises an electric motor supplied from storage cells, and a motor driving circuit for controlling the rotation of the motor by increasing or decreasing a duty ratio employing pulse-width-modulation or chopper control, the motor driving circuit receives an instruction of the duty ratio corresponding to the opening degree of an accelerator set by a driver.

Moreover, the traveling control apparatus includes duty ratio setting means for, based on both a terminal voltage of the storage cells and the opening degree of the accelerator, increasing the duty ratio depending on a reduction in the terminal voltage so that an effective voltage supplied to the motor is kept the same as supplied at the equal opening degree of the accelerator in a fully charged condition of the storage cells.

According to a second aspect of the present invention, a regeneration brake for an electric vehicle comprises an electric motor powered by storage cells, a motor driving circuit for controlling the rotation of the motor through pulse-width-modulation or chopper control, and regenerative braking means employing the motor as an electric dynamo temporarily while the vehicle is decelerated for charging the storage cells with regenerated electric power.

Further, the regeneration brake comprises a regeneration determining means for determining whether the storage cells can be charged with the regenerated electric power or not based on the amount of electric power regenerated by the regeneration brake and the amount of electric power chargeable to the storage cells when the regenerative braking operation is effected. An electric power consuming means is also provided for distributing the surplus regenerated electric power to the motor driving circuit based on determination by the regeneration determining means that the storage cells are not able to be charged, so that the surplus regenerated electric power is consumed by the motor driving circuit.

According to a third aspect of the present invention, a protective device for an electric vehicle comprises a sensor for detecting changes in a physical variable depending on operation of a loaded equipment, a comparison/determination means having determination reference values at a first alarm level and a second stop level, compares an output of the sensor with the reference level values, and determines an operation level of the equipment. An alarm means informs a driver of an abnormality of the equipment based on determination of the first alarm operation level made by the comparison/determination means, and a stop means stops operation of the equipment based on determination of the second stop operation level made by the comparison/determination means. The comparison/determination means includes a third stop determination level in addition to the second stop determination level, and the operation of the equipment is stopped upon determination that any of the second and third stop determination levels is reached. A cancel switch is provided for canceling the operation of stopping the equipment effected for the first time upon determination that the second stop determination level is reached.

With the traveling control apparatus for electric vehicles, according to the first aspect of the present invention, the duty ratio is increased depending on a reduction in the battery terminal voltage based on both the terminal voltage and the opening degree of the accelerator so as to supply the same effective voltage to the motor for maintaining the motor output power at a constant value regardless of how the battery is consumed. This enables a driver to always perceive a steady agreeable traveling feeling.

In accordance with the second aspect of the present invention having the regeneration brake for electric vehicles, the motor driving circuit intrinsically loaded on the electric vehicle is controlled to consume electric power by itself so that the motor driving circuit can perform the operation of consuming electric power when the electric power cannot be returned to the battery. Therefore, the regenerative braking forces can surely be maintained and reliability of the regeneration brake can be improved regardless of how the battery is consumed. In other words, electric power can be consumed by controlling the motor driving circuit which is usually loaded on the electric vehicle, with no need of providing a dedicated circuit which is required only to consume surplus electric power. As a result, the weight and the space additionally required for the dedicated circuit are no longer necessary, complication of the brake structure can be prevented, and the cost can be reduced. Further, since the switching devices of the motor driving circuit are intrinsically formed of large-sized devices for the purpose of motor driving and provided with means for ensuring a sufficient degree of heat radiation, the motor driving circuit can double as a circuit for consuming surplus electric power with no problems.

In accordance with the third aspect of the present invention having the protective device for electric vehicles, a new preliminary stop operation is added to the alarm/stop operation of a conventional protective device, and the cancel switch is provided to override the preliminary stop operation for canceling the stop operation effected for the first time by the protective device. Therefore, if the equipment is continuously operated in disregard of an alarm issued by the protective device and the operation of the equipment is stopped for the first time by the protective device, the stop operation by the protective device can be canceled, allowing the driver to continue the operation of the equipment so that the equipment is prevented from being stopped in unwanted situations. For example, when the protective device is to monitor a temperature condition of the traveling motor, the automobile can be prevented from stalling in a place where it should not be stopped, such as an intersection or a railroad crossing. In this respect, since the motor operation ability is not lowered in the stage of alarm/stop operation, the traveling speed is maintained and the driver can quickly move the automobile away from the improper place for higher safety.

Additionally, when an alarm is issued by the protective device, the driver is informed through vibrations of a vibrating alarm unit. The alarm can surely be transmitted to the driver of even an electric motorcycle, such as a scooter, regardless of traffic situations in the surroundings, ambient noise and/or running conditions, resulting in improved safety.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

DESCRIPTION OF THE PREFERRED EMBODIMENTS

Figure 1A:
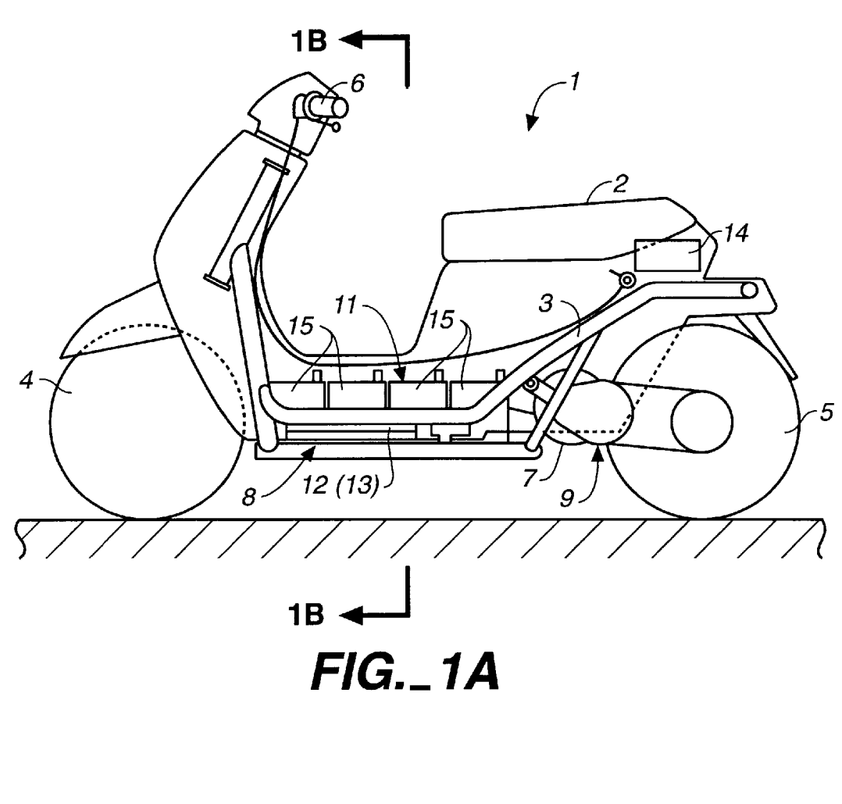
FIGS. 1A and 1B are side and front views, respectively, schematically illustrating an electric vehicle, preferably an electric motorcycle in accordance with the present invention.
Figure 1B:
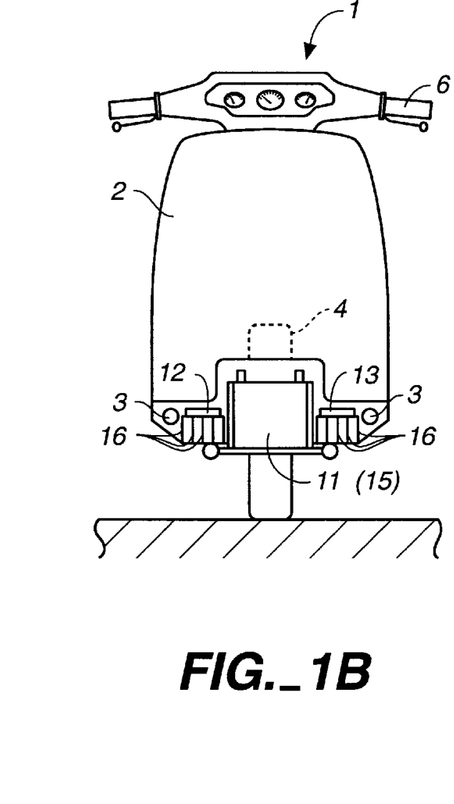

The first to fourth inventions of this application will hereinafter be described in connection with embodiments shown in FIGS. 1 to 10. An electric vehicle, preferably an electric motorcycle, in the illustrated embodiments is as shown in FIGS. 1A and 1B. The following description in this specification will be made, taking an electric motorcycle (including a scooter) as an example. Basic arrangements common to the embodiments of the first to fourth embodiments will first be explained before describing the embodiments in detail.

An electric motorcycle 1 includes road wheels 4, 5 positioned respectively in front and rear parts of a vehicle body 2 and suspended from a main frame 3 of the vehicle body, similar to a conventional motorcycle driven by a combustion engine. Front wheel 4 is steered by a handle 6, and the rear wheel 5 is rotatively driven by an electric motor 7 instead of a combustion engine.

Main frame 3 mounts thereon an electric power apparatus 8 for supplying electric power to propel the motorcycle for traveling, and a power transmitting apparatus 9 for converting the electric energy supplied from electric power apparatus 8 into mechanical movement by electric motor 7 and transmitting rotation of the motor to the rear wheel. Other parts such as an accelerator grip provided on handle 6, brake levers, brake mechanisms and suspensions, some of them being not shown, are basically the same as those used in conventional motorcycles. The accelerator grip and the brake levers are electrically connected to the electric power apparatus.

Electric power apparatus 8 comprises a battery power supply 11 mounted in a low-level position substantially centrally of main frame 3 of vehicle body 2, a charger 12, a motor driving circuit 13 and a control circuit 14 which are disposed in respective places inside vehicle body 2, and various sensors provided respectively on relevant equipment loaded on the motorcycle. These control/driving circuits of electric power apparatus 8 supply, to electric motor 7, driving electric power in accordance with a demand instructed upon operation by a driver, thereby propelling the electric motorcycle to advance at a demanded speed.

Battery power supply 11 is made up by a plurality of storage cells 15 fixed to the frame through a bracket. In electric motorcycle 1 of this embodiment, the battery power supply 11 is preferably made up by four storage cells 15, 15 . . . which are connected in series by large-diameter cables to produce a predetermined value of voltage while preventing transmission loss of large electric power. Of course, as will be appreciated by one of ordinary skill in the art, the number of storage cells and their connection are determined by the storage capacity thereof and the energy requirement of the motor and other components.

Motor driving circuit 13 is preferably constituted by a circuit comprising MOS-FETs which are high-speed switching devices for large electric power. Chopper or pulse-widthmodulation control is made by switching operation of the FET circuit to increase or decrease an effective voltage supplied to the motor for controlling a rotational speed of the motor. On vehicle body 2 right under motor driving circuit 13, large-sized heat radiating plates 16 are provided to dissipate the large amount of heat generated with the switching operation of motor driving circuit 13 to open air, thereby achieving a sufficient degree of heat radiation.

Figure 2:
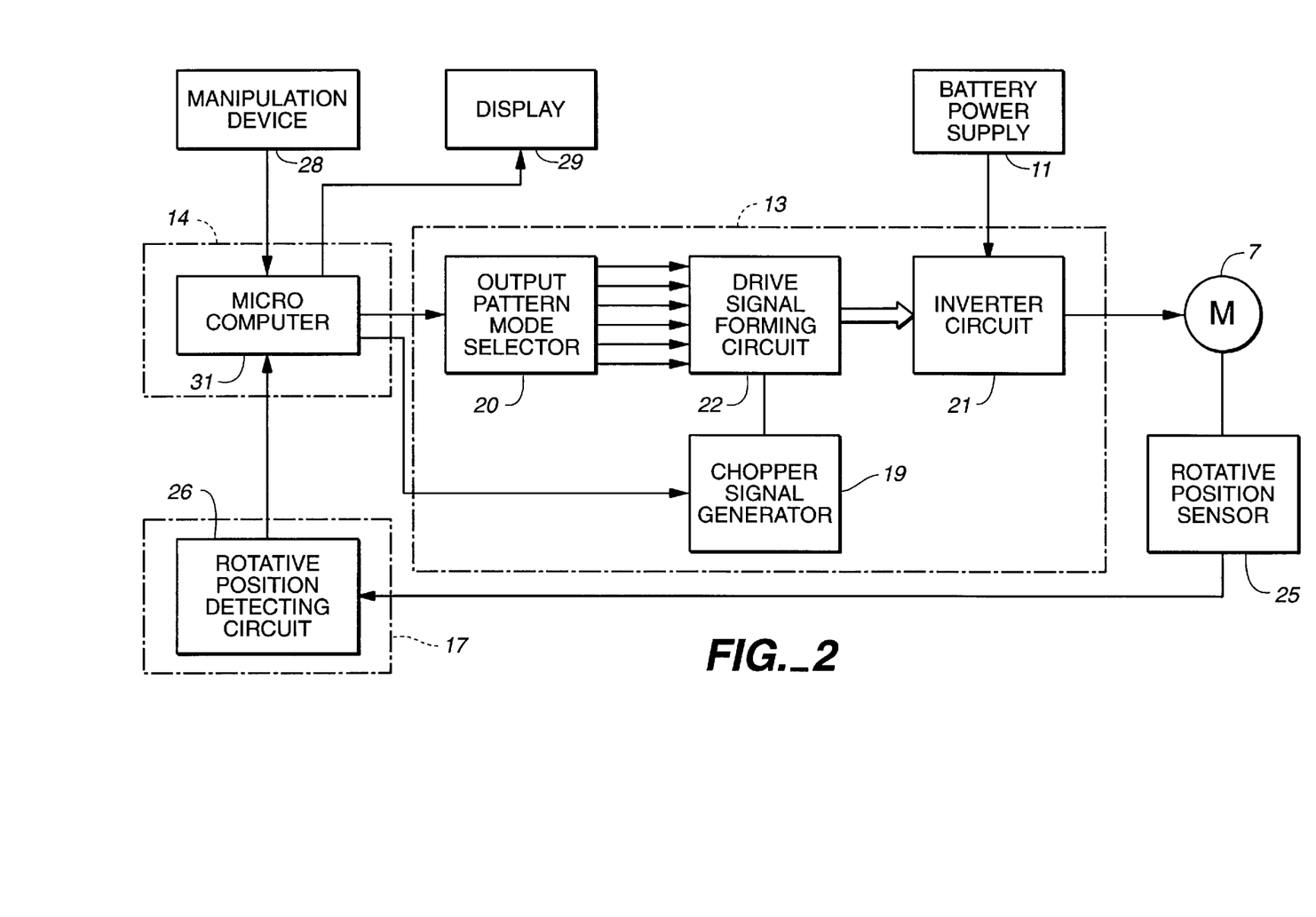
FIG. 2 is a block diagram depicting a motor power apparatus of the electric motorcycle.

Electric power apparatus 8 thus controlling and driving electric motor 7 comprises, as shown in FIG. 2, a detector 17 for detecting the position and speed of rotation of electric motor 7. The detection by detector 17 is used in rotation control of electric motor 17, as explained below. Electric power apparatus 8 also comprises battery power supply 11 for supplying electric power to motor 7, motor driving circuit 13 for making chopper control of the supplied electric power in accordance with a set signal from control circuit 14 and supplying it to the motor at the proper timing and in the proper amount of electric power. Control circuit 14 also receives a control signal issued upon the driver operating a manipulation device and a detection signal from detector 17 and outputting a command to control motor driving circuit 13 based on those input signals.

Motor driving circuit 13 comprises a chopper signal generator 19 for changing a chopper signal and changing the duty ratio to a set value based on a duty ratio setting signal from control circuit 14, an output pattern mode selector 20 for selecting a commutation mode and outputting it based on a commutation signal from control circuit 14, a drive signal forming circuit 22 for, based on the selected commutation mode, outputting signals to effect on/off switching operation of transistors of an inverter circuit 21, and inverter circuit 21 connected to battery power supply 11 for, based on the above signals from circuit 22, switching the transistors to supply excitation currents to respective coils of the motor in the switched condition. Specifically, based on the commutation signal output from control circuit 14 at the proper timing, output pattern mode selector 20 outputs a next excitation pattern mode. Then, based on this pattern mode, the drive signal forming circuit 22 outputs signals for switching the transistors of inverter circuit 21. In accordance with the selected mode, inverter circuit 21 supplies excitation currents to respective coils of the motor in the switched condition, whereupon motor 7 is rotatively driven. Further, chopper signal generator 19 generates a chopper signal and outputs it to drive signal forming circuit 22 based on both a chopper switching command and a duty ratio setting signal for designating the rotational speed of the motor which are issued from control circuit 14.

Detector 17 comprises a rotational position sensor 25 using, for example, Hall-effect devices or the like provided on motor 7 for detecting the rotational position of motor 7, and a rotational position detecting circuit 26 for determining the rotational position of a motor rotor of motor 7 based on a sensor signal and outputting it to control circuit 14.

Control circuit 14 is preferably comprised by a microcomputer or microprocessor 31 which is connected to a manipulation device 28, a display 29, and various sensors provided respectively on relevant equipment loaded on the motorcycle. Of course, discrete components may be used in lieu of microcomputer 31. Microcomputer 31 comprises an A/D converter for converting analog input signals into digital signals, I/O ports, a CPU, memories, etc., and outputs a control command for proper operation, such as a duty ratio setting signal, to motor driving circuit 13 based on a demanded value from the manipulation device and detection signals from the various sensors. The first and second embodiments of the present invention are realized by setting programs stored in microcomputer 31 of control circuit 14 such that motor 7 is operated to produce constant output power and regenerative braking forces regardless of the remaining capacity of the storage cells.

First Embodiment

The first embodiment of the present invention is intended to prevent variations in operating performance of electric vehicles caused by, for example, the battery discharge voltage being lowered and the motor driving forces being reduced with consumption of the battery, for example, while the electric automobile is traveling. This is achieved by increasing the duty ratio corresponding to a reduction in the battery terminal voltage based on both the terminal voltage and the opening degree of the accelerator. The duty ratio is defined as the ratio of the time period a signal is applied to the period of time of each cycle. As a result, the same effective voltage is supplied to the motor to maintain the motor output power at a constant level regardless of the consumption of the battery, thereby providing a comfortable, steady ride at all times.

The preferred embodiment of the present invention will be described below with reference to FIG. 3. In the traveling control apparatus of the preferred embodiment, the duty ratio is calculated by using one of calculation formulae set for each value of the opening degree of the accelerator and the battery terminal voltage, which is selected depending on the measured terminal voltage. Specifically, the calculation formulae are linear equations each representing a gradient for each of terminal voltages shown in FIG. 3, and one of the linear equations closest to the actually measured terminal voltage is selected for calculating the duty ratio. Also, the voltage lines are defined with one of them representing 40 V as a reference. Stated otherwise, the voltage line of 40 V is set to have a proportional relationship between the opening degree (%) of the accelerator and the duty ratio (%), and the other voltage lines are set to maintain that relationship. Specifically, for each of the other voltage lines, the product of the voltage value (V) and the duty ratio at the respective opening degree of the accelerator is always the same as the product of 40 V and the duty ratio at the same opening degree of the accelerator.

For example, when the terminal voltage of the storage cells is lowered from 45 V to 40 V while the electric motorcycle is traveling at a full speed with the opening degree of the accelerator being set to 100%, the duty ratio is increased from 89% to 100%. With the increased duty ratio, the effective voltage supplied to the motor is kept constant regardless of a reduction in the terminal voltage of the storage cells, thereby maintaining the same traveling performance. Also, at the terminal voltage of the storage cells in excess of 40 V, the duty ratio is continuously linearly varied depending on changes in the opening degree of the accelerator over an entire range of the opening degree of the accelerator so that the driver can always perceive a steady traveling feeling regardless of how the energy of the stored battery is consumed.

With this embodiment, as described above, the duty ratio is increased depending on a reduction in the battery terminal voltage based on both the terminal voltage and the opening degree of the accelerator so as to supply the same effective voltage to the motor for maintaining the motor output power at a constant value regardless of how the stored energy of the battery is consumed. This make it possible for the driver to always perceive a steady agreeable traveling feeling. Also, since the duty ratio is calculated by using calculation formulae defined for respective voltage values rather than using a table in which discrete values are stored, required memory capacity of the circuit can be reduced. Further, since the duty ratio itself is continuously varied depending on the opening degree of the accelerator by using the calculation formula, the traveling feeling is expected to be further improved.

Second Embodiment

The second embodiment of the present invention will now be described with reference to FIGS. 4 and 5. In a traveling control apparatus for electric automobiles of this embodiment, the above-mentioned basic graph shown in FIG. 3 is modified into a range graph in which the battery terminal voltage and the opening degree of the accelerator is plotted for each value of the duty ratio as shown in FIG. 4. Based on this range graph, a table shown in FIG. 5 is prepared. Then, the table is stored in a lookup table or memory of the control circuit, and the duty ratio for controlling the rotational speed of the motor is determined by referring to the table. In other words, as with the first embodiment, the duty ratio is set based on both the terminal voltage of the storage cells and the opening degree of the accelerator by referring to the table.

Figure 3:
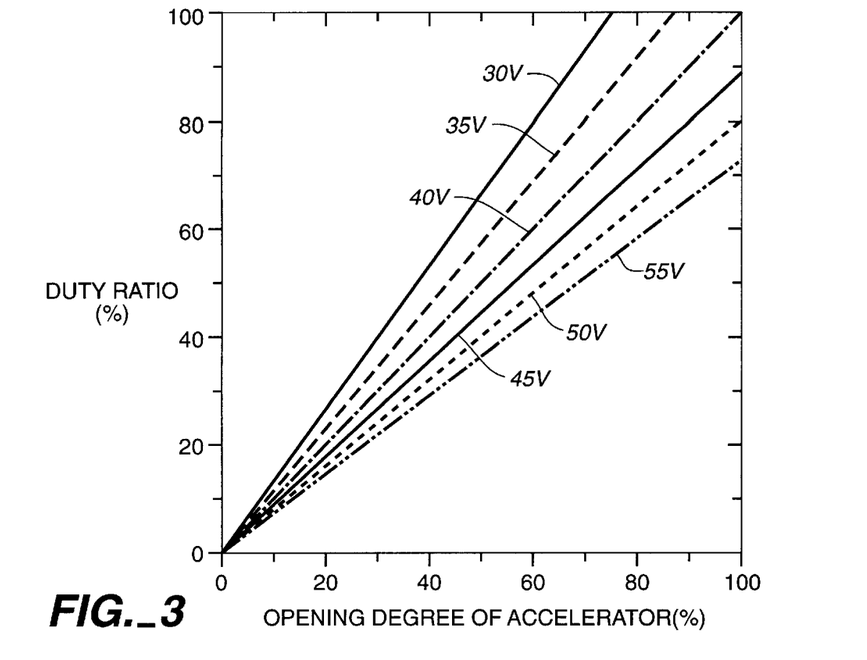
FIG. 3 is a graph for determining a duty ratio from the terminal voltage of storage cells in accordance with the first embodiment of the present invention.
Figure 4:
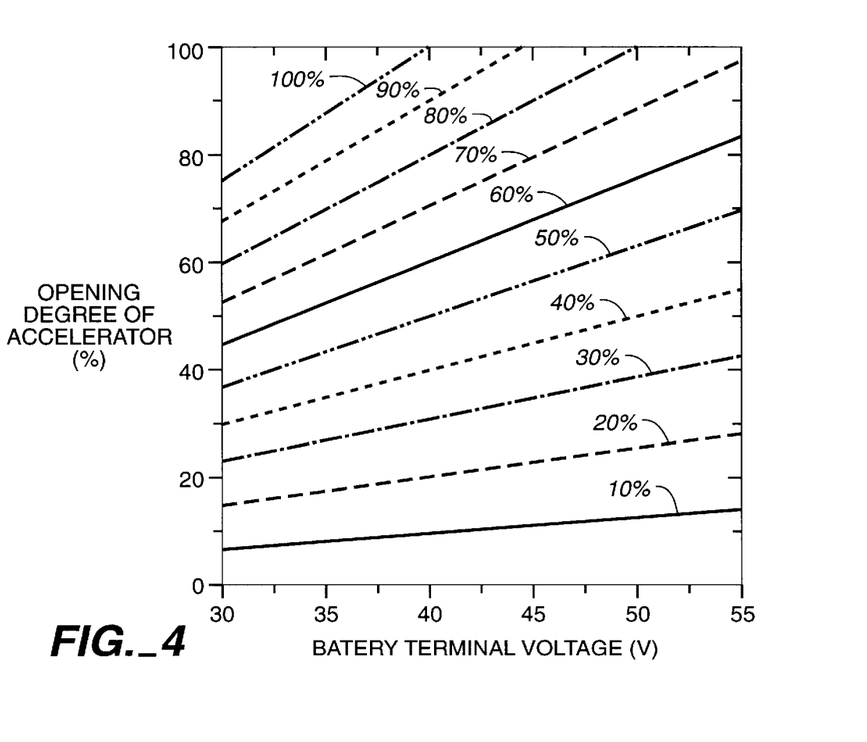
FIG. 4 is a graph for determining a duty ratio from the terminal voltage of storage cells and the degree of accelerator control in accordance with the second embodiment of the present invention.
Figure 5:
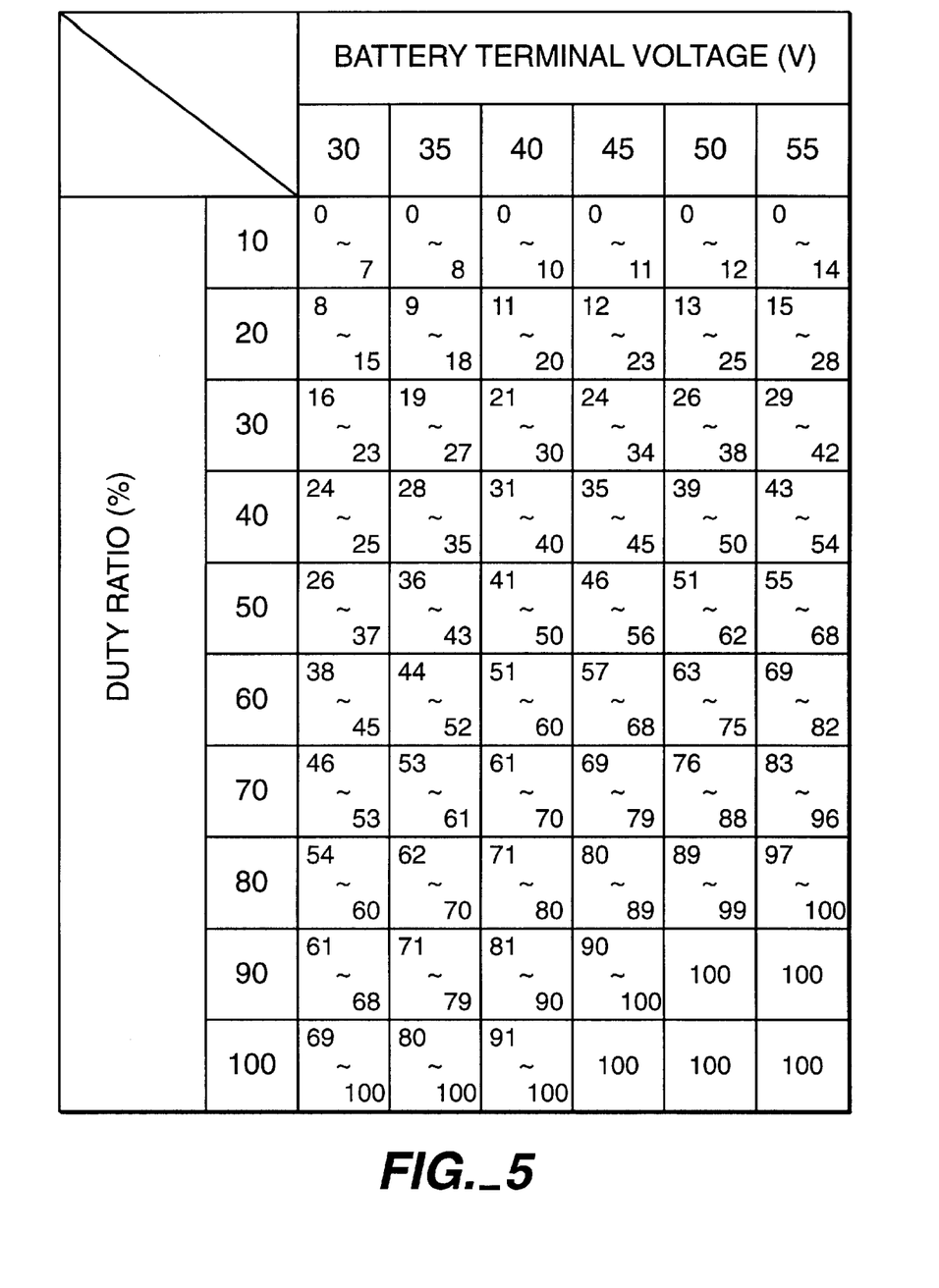
FIG. 5 is a table for setting a duty ratio from the terminal voltage of storage cells and the opening degree of an accelerator in accordance with the second embodiment of the present invention.

The range graph of FIG. 4 is intended to, from the basic setting graph of FIG. 3 used in the first embodiment, show boundary regions for changing the duty ratio in the relationship between the terminal voltage of the storage cells and the opening degree of the accelerator.

In the table prepared from the range graph, divisions for values of the terminal voltage measured during use of the battery are set along the horizontal axis, and divisions for values of the duty percentage instructed by the motor driving circuit are set along the vertical axis. Then, each section delimited in terms of the voltage value and the percentage value represents a range of the opening degree of the accelerator which is determined from the range graph of FIG. 4 as satisfying the duty percentage condition necessary to supply the same effective voltage to the motor at the respective voltage values. While the electric motorcycle is powered by battery, the duty ratio is set by referring to the table from both the opening degree of the accelerator instructed by the driver and the value of the battery terminal voltage at that time. More specifically, based on the battery terminal voltage measured, the corresponding column of battery terminal voltage in the table is determined. Then, from among the ranges of the opening degree of the accelerator shown in respective sections belonging to the determined row, the section including the opening degree of the accelerator instructed at that time is determined. Finally, the row of duty percentage corresponding to the determined section is determined to set the duty ratio. For example, when the terminal voltage of the storage cells is lowered from 50 V to 45 V while the electric motorcycle is traveling at a high speed with the opening degree of the accelerator being set to 90%, the duty ratio is increased from 80% to 90%. With the increased duty ratio, the effective voltage supplied to the motor is kept constant regardless of a reduction in the terminal voltage of the storage cells, thereby maintaining the same traveling performance.

While each of the sections making up the table of this embodiment is given by the range of the opening degree of the accelerator satisfying the comparative determining condition, the present invention is not limited to the illustrated embodiment. The comparative determining condition may be modified to define the range of each section by only an upper or lower limit value. In this modified case, the total amount of data can be reduced and the required memory can be reduced.

With this embodiment, as described above, the duty ratio is set by using the table. In addition to the similar advantage as in the above first embodiment, therefore, the traveling performance of electric vehicles can be improved providing the table with specific characteristics.

Third Embodiment

Figure 6:
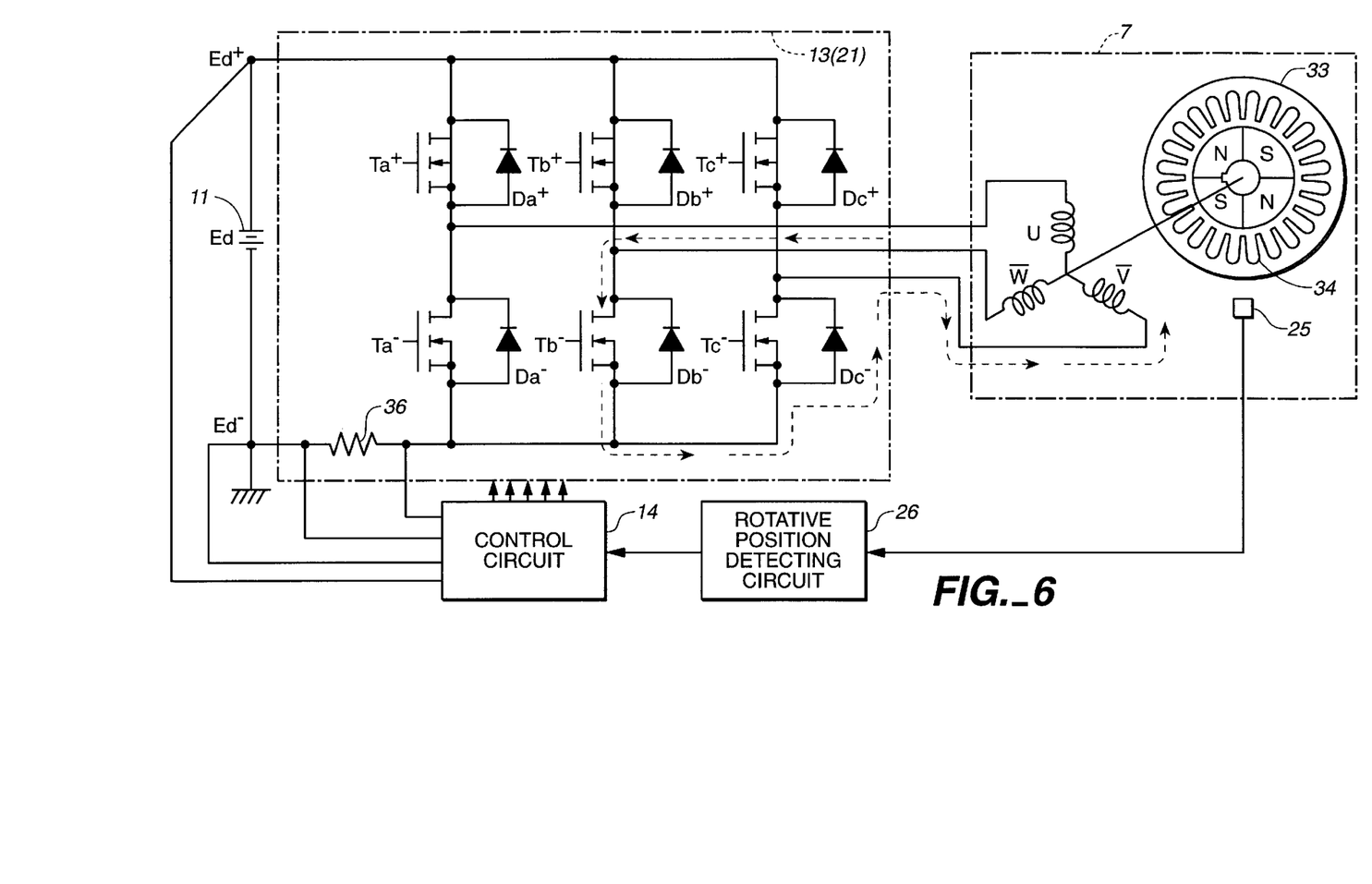
FIG. 6 is a schematic diagram depicting the third embodiment of a regeneration brake for electric vehicles according to the present invention.
Figure 7:
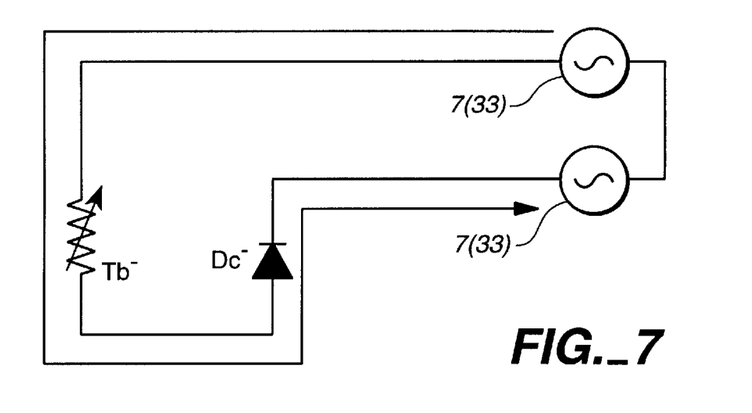
FIG. 7 is an equivalent circuit diagram of the third embodiment of the present invention.

A regeneration brake for electric vehicles according to the third embodiment of the present invention shown in FIGS. 6 and 7. In the regeneration brake of this embodiment, the operation of the motor driving circuit is controlled by using the above-explained basic arrangement so that the motor driving circuit consumes regenerated electric power to stably ensure regenerative braking forces regardless of how the storage cells are consumed.

More specifically, as shown in FIG. 6, the regeneration brake of this embodiment comprises electric motor 7 for powering the vehicle, battery power supply 11, motor driving circuit 13, and control circuit 14. The embodiment of the present invention is realized, similarly to the above first embodiment, by software controlling microcomputer 31 of control circuit 14.

Electric motor 7, for powering the vehicle, is constituted by, for example, a brushless DC motor which comprises a stator 33 fixed to the vehicle body and a rotor 34 rotatably disposed within stator 33. Four sets of windings for each of 3-phase coils U, V, W are fitted over stator 33, and rotor 34 has four magnetic poles formed by permanent magnets.

Coils U, V, W of stator 33 are separately connected to inverter circuit 21 in motor driving circuit 13 so that excitation currents are selectively supplied to the respective coils. More specifically, inverter circuit 21 comprises transistors $Ta^+$, $Tb^+$, $Tc^+$ on the P (positive) side to which are backwardly connected free-wheel diodes $Da^+$, $Db^+$, $Dc^+$, respectively, and transistors $Ta^-$, $Tb^-$, $Tc^-$ on the N (negative) side to which are backwardly connected free-wheel diodes $Da^-$, $Db^-$, $Dc^-$, respectively. These transistors are preferably constituted by MOS-FETs (metal-oxide-semiconductor field effect transistors), for achieving control of the high-speed switching operation of large currents. A drain-source current of each MOS-FET is used as the current supplied to electric motor. Then, a pair of transistors, comprising one transistor on the P side and one transistor on the N side, are combined with each other and the switching operation of the paired transistors is controlled to perform chopper control for changing the duty ratio so that the effective voltage supplied to the motor coil is increased or decreased to control the rotational speed of the motor. At the same time, 3-phase DC currents are successively supplied to a selected pair of coils of the 3-phase coils in switched manner, thereby forming magnetic fields for rotation to rotatively drive the rotor 34 continuously.

The rotational position of motor rotor 34 is detected by rotational position sensor 25 formed of Hall-effect devices or the like. The currents supplied to the motor coils are switched over at the proper timing in accordance with a detected sensor signal. Specifically, in response to the sensor signal, rotational position detecting circuit 25 for determining the rotational position of motor rotor 34 is connected to control circuit 14 and, in response to a motor rotational position detected signal from rotational position detecting circuit 25, control circuit 14 selectively performs on/off operation of transistors Ta, Tb, Tc of inverter circuit 21 at the proper timing.

Incidentally, denoted by 36 is a shunt resistor for measuring a charging/discharging current to and from battery power supply 11. Based on the measured current, control circuit 14 determines the remaining capacity of battery power supply 11.

Inverter circuit 21 in motor driving circuit 13 is employed as a booster for the counter electromotive voltage produced during normal regeneration. Specifically, when the counter electromotive voltage is produced in W-phase coil at a certain point in time during the regeneration and a current flows as indicated by dot lines in FIG. 6, the current is returned to the battery power supply through free-wheel diode $Db^+$ for regenerative charging of the battery by turning off transistor $Tb^-$ after the lapse of a predetermined time from the generation of that current.

Further, by carrying out gate control of transistors Ta, Tb, Tc of inverter circuit 21 at the proper timing depending on the coils in which the counter electromotive voltage is induced, the electric power produced by motor 7 can be consumed by transistors Ta, Tb, Tc. During the regenerative operation, the regenerated current passes transistor $Tb^-$ and is returned to motor 7 through return diode $Db^-$. By controlling the gate of transistor $Tb^-$ at this time, it is possible to consume the current.

More specifically, a gate voltage applied to transistor $Tb^-$ is adjusted so as to increase on-resistance of the transistor $Tb^-$ for converting the current flowing between drain and source of the transistor $Tb^-$ into heat for consumption. Thus, as shown in an equivalent circuit diagram of FIG. 7, the regenerated electric power is consumed by using transistor $Tb^-$ as a variable resistor. Note that the motor driving circuit is provided with means for ensuring a sufficient degree of heat radiation because it generates heat likewise during the normal switching operation to drive the motor. Therefore, even if the regenerated electric power is consumed by the inverter circuit, the circuit function will not be impaired.

Next, the operation of the regeneration brake will be described. When electric power is regenerated from the motor upon the electric motorcycle being braked, the control circuit compares the regenerated electric power and the chargeable amount of the storage cells and determines which one of them is greater. Then, the control circuit determines as to whether the motor driving circuit performs normal charging operation or the consuming operation.

First, when the regenerated electric power is not greater than the chargeable amount of the storage cells, inverter circuit 21 in motor driving circuit 25 is employed as a booster to perform the normal regenerative operation so that the storage cells are charged with the regenerated electric power.

Next, when the regenerated electric power is greater than the chargeable amount of the storage cells, the control circuit outputs a predetermined signal to the motor driving circuit which starts the operation of consuming the regenerated electric power by itself. Specifically, at the time the current flows through the transistor corresponding to the coil in which the counter electromotive voltage has been induced, the gate voltage applied to that transistor is adjusted so as to increase its on-resistance, thereby converting the current into heat for consumption.

While the chargeable amount of the storage cells in the regenerative braking operation is determined in this embodiment by directly measuring the terminal voltage of the storage cells, the present invention is not limited to the illustrated embodiment. The chargeable amount of the storage cells may be determined by using a capacity meter generally mounted on electric vehicles. By way of example, if the circuit is designed using an integral type remained capacity meter to be able to determine the charging situations by the regenerated electric power, when the regeneration brake is continuously effected as encountered in the condition of running over a long down slope, the storage cells can be charged at the beginning of regeneration and, even after the storage cells have been fully charged with the regenerated electric power, the operation is automatically switched to the consumption mode by the motor driving circuit. Therefore, the regenerative braking ability can be prevented from being deteriorated.

With the regeneration brake for electric vehicles of this embodiment, the motor driving circuit intrinsically loaded on the electric vehicle is controlled to consume electric power by itself so that the motor driving circuit can perform the operation of consuming electric power when the electric power cannot be returned to the battery. Therefore, the regenerative braking forces can surely be maintained and reliability of the regeneration brake can be improved regardless of how the battery is consumed. In other words, electric power can be consumed by controlling the motor driving circuit which is usually loaded on the electric vehicle, with no need of providing a dedicated circuit which is required only to consume surplus electric power. As a result, the weight and the space additionally required for the dedicated circuit are no longer necessary, the brake structure can be more simple constructed, and the cost can be reduced. Further, since the switching devices of the motor driving circuit are intrinsically formed of large-sized devices for the purpose of motor driving and provided with means for ensuring a sufficient degree of heat radiation, the motor driving circuit can double as a circuit for consuming surplus electric power without encountering further problems.

Fourth Embodiment

The fourth embodiment of the present invention will be described below in connection with FIGS. 8 to 10. A protective device of the fourth embodiment is intended to not only add a new preliminary stop operation to the alarm/stop operation of a conventional protective device, but also cancel the stop operation effected for the first time by providing a cancel switch to override the preliminary stop operation. In this embodiment, a description will be made of a motor protective device for monitoring an operating temperature of the traveling motor, issuing an alarm to the driver and effecting the operation to stop the motor. Also, the protective device of this embodiment is designed to issue an alarm with vibrations, rather than alarming by visual display, so that the alarm is surely transmitted to the driver.

Figure 8:
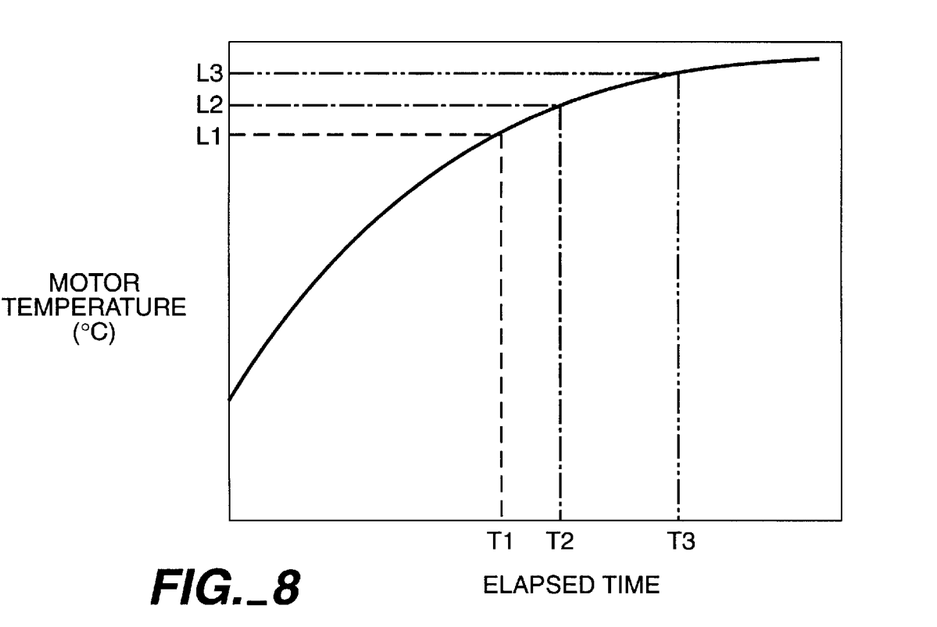
FIG. 8 is a graph showing the relationship between a motor temperature and comparative reference values.

More specifically, as shown in FIG. 8, when the temperature of motor 7 is gradually increased because of its continued operation while the electric vehicle is traveling, the conventional protective device is designed to first issue an alarm to the driver at the time the motor temperature reaches L1, and then immediately stop the motor at the time of L2. By contrast, in the protective device of this embodiment, the motor is stopped likewise at the time of L2, but the motor stop operation effected by the protective device can be overridden by operating a cancel switch, enabling the motor to be further driven until the succeeding time of L3. Then, at the time of L3, the motor is completely stopped with no possibility of cancellation.

Figure 9:
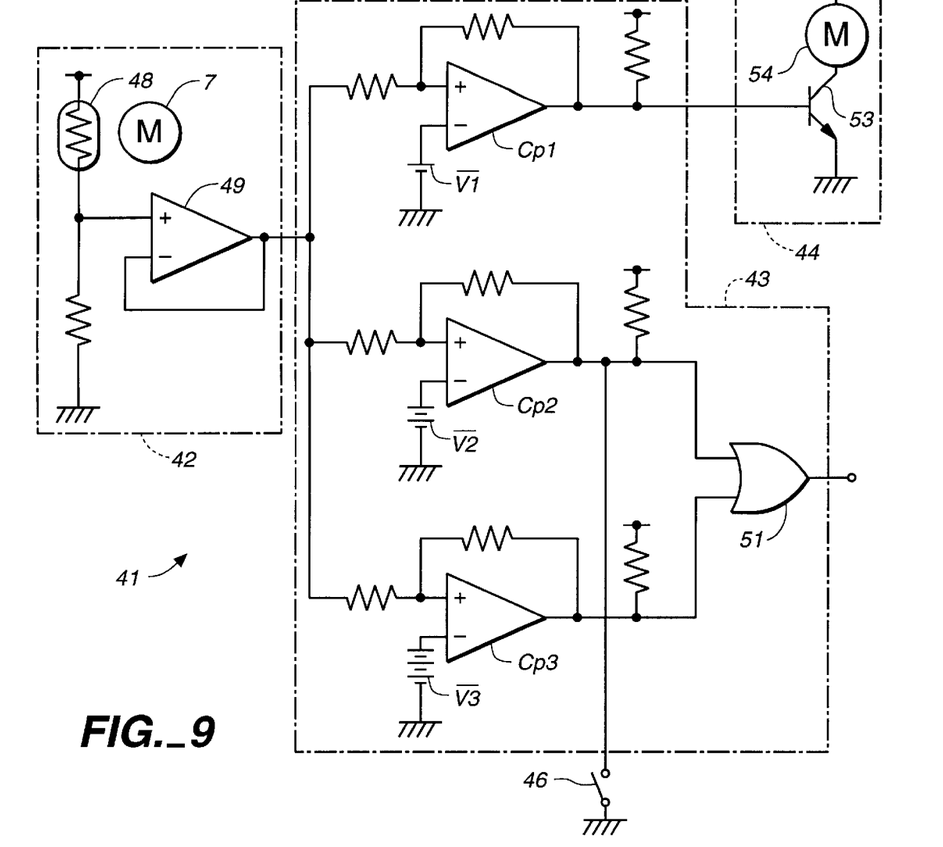
FIG. 9 is an overall circuit diagram schematically showing the device in accordance with the fourth embodiment of the present invention.

A protective device 41 for electric automobiles of this embodiment comprises, as shown in FIG. 9, a temperature detector 42 associated with motor 7, a comparison/determination circuit 43 for, based on detected temperature data, comparing the temperature data with three reference levels and determining the motor condition, a vibrating alarm unit 44 and a motor stop circuit (not shown) downstream of comparison/determination circuit 43 which are operated by respective determination signals, and a cancel switch 46 for canceling a stop signal issued for the first time.

Temperature detector 42 comprises a temperature sensor 48 disposed in motor 7 and a buffer circuit 49 for accumulating an output of temperature sensor 48, and is connected to comparison/determination circuit 43. Temperature sensor 48 is formed of, for example, a thermistor for converting temperature into a resistance value. A change in the voltage value at a resistor connected in series to thermistor 48 is taken as an accurate voltage value through buffer circuit 49 comprising an operational amplifier with maximum negative feedback. Thus, temperature detector 42 measures an increase in the motor temperature with operation of motor 7 while the electric vehicle is traveling, and outputs the measured motor temperature, as a voltage value, to comparison/determination circuit 43 in the downstream stage.

Comparison/determination circuit 43 comprises three comparators Cp1, Cp2, Cp3 of which positive input terminals are connected in parallel to an output line of temperature detector 42, and a logical OR circuit 51 of which input terminals are connected respectively to output terminals of the comparators Cp2, Cp3. Vibrating alarm unit 44 is connected downstream of comparator Cp1, and the motor stop circuit is connected downstream of comparators Cp2, Cp3 through OR circuit 51. Incidentally, denoted by 53 is a transistor which turns on in response to an output of comparator Cp1. Upon turning-on of transistor 53, a driving current is supplied to a drive motor 54 of vibrating alarm unit 44, described later, for operating it.

For comparators Cp1, Cp2, Cp3, respective predetermined comparative reference values are set beforehand. By comparing the reference values and the voltage value representing the measured temperature, comparators Cp1, Cp2, Cp3 determine the condition of operating temperature of motor 7 and issue an alarm to the driver or stop the operation of the motor 7. Specifically, for comparators Cp1, Cp2, Cp3, voltage comparative values corresponding to temperature levels L1, L2, L3 in FIG. 8 are set beforehand by supply voltages V1, V2, V3 that are each supplied from a single power supply provided for each comparator Cp. Therefore, when the comparison made by comparator Cp is satisfied, an output signal taken from its output terminal assumes a high level, thereby operating vibrating alarm unit 44 for issuing an alarm to the driver or the motor stop circuit for stopping the operation of motor 7, which is connected downstream of comparator Cp.

Logical OR circuit 51 has input terminals connected respectively to the output terminals of comparators Cp2, Cp3, and an output terminal connected to the motor stop circuit. Therefore, in accordance with the logical OR condition of OR circuit 51, the motor stop circuit in the downstream stage is operated by a high-level level signal output from one of comparators Cp2, Cp3 connected upstream of OR circuit 51.

Further, cancel switch 46 has one terminal connected to a line connecting between comparator Cp2 and logical OR circuit 51, and has the other terminal grounded. Accordingly, when cancel switch 46 is turned on, the high-level signal from comparator Cp2 is passed to the ground and output to neither logical OR circuit 51 nor the motor stop circuit. In other words, the motor stop operation effected for the first time upon satisfaction of the comparison made by the comparator Cp2 is overridden. Also, by turning on cancel switch 46 in advance, it is possible to always cancel the stop operation effected for the first time and render the protective device to operate in the same manner as conventional.

Figure 10:
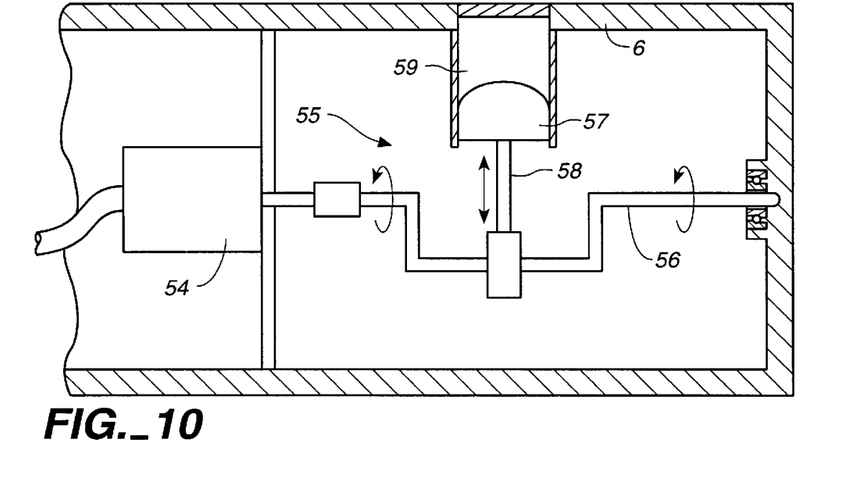
FIG. 10 is a schematic vertical cross-sectional view showing a vibration alarm device of the fourth embodiment of the present invention.

Vibrating alarm unit 44 connected to comparator Cp1 comprises, as shown in FIG. 10, a drive motor 54 fixedly disposed in an accelerator grip of steering handle 6, and a mechanical vibrating mechanism 55 driven by motor 54 and being also housed in the accelerator grip.

More specifically, drive motor 54 is supplied with a driving current in response to a high-level output signal of comparator Cp1 and starts rotating. Vibrating mechanism 55 comprises a crankshaft 56 disposed to extend in the longitudinal direction of the accelerator grip and having one end which is coaxially coupled to an output shaft of drive motor 54 and the other end which is supported by a distal end of the accelerator grip, a crank rod 58 having a base end coupled to an intermediate bent portion of the crankshaft 56 and a tip end coupled to a weight 57, and a cylinder 59 fixed to the accelerator grip and holding weight 57 in a reciprocally movable manner. Therefore, when drive motor 54 is energized to rotatively operate crankshaft 56, weight 57 is reciprocally moved in the vertical direction in FIG. 10 to vibrate the entire grip for issuing an alarm to the driver through vibrations of the grip.

The operation of the thus-constructed protective device 41 of this embodiment will be described below.

First, when the temperature of motor 7 is low and temperature detected voltage value V from temperature detector 42 is also low, the comparisons made by all comparators Cp of comparison/determination circuit 43 are not satisfied and the output of each comparator Cp is held at a low level. Therefore, vibrating alarm unit 44 and the motor stop circuit connected to the comparators is kept in an off state and not operated.

Then, when the motor temperature is raised, for example, after traveling continuously for a long time and the temperature detected voltage value V reaches the alarm level V1, the comparison made by comparator Cp1 is satisfied, and comparator Cp1 outputs a high-level signal instructing the start of operation of vibrating alarm unit 44 in the downstream stage. Vibrating alarm unit 44 vibrates the entire grip to surely inform the driver of an alarm indicating that the operating temperature of motor 7 is raised beyond a threshold and operation of the electric vehicle should be stopped.

If the driver continues traveling from the above condition and the voltage value representing the motor temperature is further raised with the continued motor operation in excess of first stop level V2, the comparison made by second comparator Cp2 is satisfied and comparator Cp2 outputs a high-level signal indicating the start of operation of the motor stop circuit through logical OR circuit 51. The operation of motor 7 is thereby stopped to stop traveling of the electric vehicle.

In this condition, by turning on cancel switch 46, the high-level output signal of comparator Cp2 is grounded, inhibiting the operation of the motor stop circuit. With the provision of cancel switch 46, therefore, it is possible to override the instruction from the protective device to stop traveling of the electric motorcycle, and allow it to continue traveling. Also, if the driver turns off the cancel switch 46 at his discretion before reaching the third stop level, the motor operation is stopped and the electric vehicle is thereby stopped.

Furthermore, if the driver continues traveling from the above condition and the voltage value representing the motor temperature exceeds the second stop level V3 with a continued increase in the motor temperature, the comparison made by third comparator Cp3 is satisfied.

Then, comparator Cp3 outputs a high-level signal indicating the start of operation of the motor stop circuit through logical OR circuit 51. The operation of motor 7 is thereby stopped, thus inhibiting the operation of the electric vehicle with no possibility of cancellation.

While the protective device of this embodiment uses a dedicated circuit for comparing and determining the temperature condition during the motor operation, it is also possible to, as with the above embodiment, input the sensor and switch signals to the control circuit, and carry out comparison and determination by using a dedicated program to instruct any operation of issuing an alarm, stopping the motor or canceling the stop operation.

While this embodiment has been described in connection with the protective device adapted for detection of the motor temperature, the present invention is not limited to the illustrated embodiment, but can also be applied to protective devices adapted for measurement of other quantities, such as overheating, excessive voltage, voltage drop, etc., of equipment. In other words, the present invention is applicable to various protective devices which are operated to detect abnormality of target equipment, issue an alarm and stop operation of the equipment based on comparison and determination between a measured value of the parameter to be monitored and a reference value.

With the protective device for electric vehicles of this embodiment, as described above, a new preliminary stop operation is added to the alarm/stop operation of a conventional protective device, and a cancel switch is provided to override the preliminary stop operation for canceling the stop operation effected for the first time by the protective device. Therefore, if the equipment is continuously operated in disregard of an alarm issued by the protective device and the operation of the equipment is stopped for the first time by the protective device, the stop operation by the protective device can be canceled, allowing the diver to continue the operation of the equipment so that the equipment is prevented from being stopped in unwanted situations. For example, when the protective device is to monitor a temperature condition of the traveling motor, the automobile can be prevented from stalling in a place where it should not be stopped, such as an intersection or a railroad crossing. In this respect, since the motor operation ability is not lowered in the stage of alarm/stop operation, the traveling speed is maintained and the driver can quickly move the automobile away from the improper place for higher safety.

Additionally, since an alarm issued by the protective device is informed to the driver through vibrations of the vibrating alarm unit, the alarm can surely be transmitted to the driver of even an electric motorcycle such as a scooter regardless of traffic situations in the surroundings and/or running conditions, resulting in improved safety.

As described hereinabove, according to the traveling control apparatus for electric vehicles in accordance with the first and second embodiments of the present invention, since the duty ratio is increased depending on a reduction in the battery terminal voltage based on both the terminal voltage and the opening degree of the accelerator so as to supply the same effective voltage to the motor for maintaining the motor output power at a constant value regardless of how the battery is consumed, the driver can always perceive a steady agreeable traveling feeling.

According to the regeneration brake for electric vehicles of the third embodiment of the present invention, since the motor driving circuit intrinsically loaded on the electric automobile is controlled to consume electric power by itself so that the motor driving circuit can perform the operation of consuming electric power when the electric power cannot be returned to the battery, the regenerative braking forces can surely be maintained and reliability of the regeneration brake can be improved regardless of how the battery is consumed. In other words, since electric power can be consumed by controlling the motor driving circuit which is usually loaded on the electric automobile, with no need of providing a dedicated circuit which is required only to consume surplus electric power, the weight and the space additionally required for the dedicated circuit are no longer necessary, complication of the brake structure can be prevented, and the cost can be cut down. Further, since the switching devices of the motor driving circuit are intrinsically formed of large-sized devices for the purpose of motor driving and provided with means for ensuring a sufficient degree of heat radiation, the motor driving circuit can double as a circuit for consuming surplus electric power with no problems.

According to the protective device for electric vehicles of the fourth embodiment of the present invention, a new preliminary stop operation is added to the alarm/stop operation of a conventional protective device, and the cancel switch is provided to override the preliminary stop operation for inhibiting the stop operation effected for the first time by the protective device. Therefore, if the equipment is continuously operated in disregard of an alarm issued by the protective device and the operation of the equipment is stopped for the first time by the protective device, the stop operation by the protective device can be inhibited, allowing the driver to continue the operation of the equipment so that the equipment is prevented from being stopped in unwanted situations. For example, when the protective device is to monitor a temperature condition of the motor, the vehicle can be prevented from stalling in a place where it should not be stopped, such as an intersection or a railroad crossing. In this respect, since the motor operation ability is not lowered in the stage of alarm /stop operation, the traveling speed is maintained and the driver can quickly move the automobile away from the improper place for higher safety.

Additionally, since an alarm issued by the protective device is provided to the driver through vibrations by the vibrating alarm unit, the alarm can reliably be transmitted to the driver of even an electric motorcycle such as a scooter regardless of traffic or noise condition in the surroundings and/or running conditions, resulting in improved safety.

As set forth above, the present invention can provide the traveling control apparatus by which the duty ratio in consideration of how the storage cells are consumed is set to ensure a steady traveling feeling, the regeneration brake which can produce stable braking forces regardless of how the storage cells are consumed, and the protective device by which a plurality of operation stop levels are set to be able to cancel the stop operation effected for the first time and to ensure reliable alarming. As a result, overall traveling performance of electric automobiles is improved.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A regeneration brake for an electric vehicle comprising an electric motor for traveling driven by electric power supplied from storage cells, a motor driving circuit for controllably rotating said electric motor through chopper control, said motor driving circuit comprising at least one transistor having a gate, a source and a drain, and regenerative braking means using said motor as an electric dynamo temporarily while said vehicle is decelerated, for charging said storage cells with regenerated electric power, wherein said regeneration brake comprises:

regeneration determining means for determining whether said storage cells can be charged with the regenerated electric power or not based on the amount of electric power regenerated by said regeneration brake and the amount of electric power chargeable to said storage cells when the regenerative braking operation is effected, and electric power consuming means for distributing the surplus regenerated electric power to said motor driving circuit based on determination by said regeneration determining means that said storage cells are no more chargeable, so that the surplus regenerated electric power is consumed by said motor driving circuit, wherein when said storage cells cannot be charged as determined by said regeneration determining means, said at least one transistor is turned on and further a gate voltage applied to said gate is adjusted to change an on-resistance between said source and drain to control the regenerated electric power.

2. A regenerative brake for an electric vehicle having an electric motor, a motor driving circuit for controllably rotating said electric motor through chopper control, said motor driving circuit comprising at least one transistor having a gate, a source and a drain, and at least one storage cell, wherein the storage cell has a capacity for being charged, wherein said electric motor acts as a dynamo when the electric vehicle is decelerated, said regenerative brake comprising:

regenerative determining means for determining if the storage cell is less than the capacity for being charge, wherein when the storage cell is less than the capacity for being charged as determined by said regenerative determining means, the storage cell is charged by said electric motor when said electric motor acts as the dynamo when the electric vehicle is decelerated; and power consuming means for consuming power produced by said electric motor when said electric motor acts as the dynamo when the electric vehicle is decelerated, when the storage cell exceeds than the capacity for being charged as determined by said regenerative determining means, wherein when said storage cell cannot be charged as determined by said regeneration determining means, said at least one transistor is turned on and further a gate voltage applied to said gate is adjusted to change an on-resistance between said source and drain to control the regenerated electric power.

3. An electric vehicle comprising:

a motor;

a motor driving circuit for controllably rotating said motor though chopper control, said motor driving circuit comprising at least one transistor having a gate, a source and a chain;

a storage cell for supplying energy to said motor, wherein the storage cell has a capacity for being charged;

a regenerative brake, wherein the motor acts as a dynamo when the electric vehicle is decelerated;

regenerative determining means for determining if the storage cell is less than the capacity for being charge, wherein when the storage cell is less than the capacity for being charged as determined by said regenerative determining means, the storage cell is charged by the motor when the motor acts as the dynamo when the electric vehicle is decelerated; and power consuming means for consuming power produced by the motor when the motor acts as the dynamo when the electric vehicle is decelerated, when the storage cell exceeds than the capacity for being charged as determined by said regenerative determining means, wherein when said storage cell cannot be charged as determined by said regeneration determining means, said at least one transistor is turned on and further a gate voltage applied to said gate is adjusted to change an on-resistance between said source and drain to control the regenerated electric power.

4. The electric vehicle according to claim 3, further comprising a speed input device responsive to an operator of the electric vehicle for inputting a desired speed of the electric vehicle; and wherein said motor driving circuit controls the electric motor by varying a duty ratio of a voltage applied to the motor, wherein said the duty ratio is set in accordance with the desired speed of the electric vehicle and the charge capacity of the vehicle, wherein the voltage is applied $t_a$ time per period of time t, and wherein the duty ratio is defined as a ratio of $t_a$ to t.

5. An electric vehicle comprising:

a motor;

a storage cell for supplying energy to said motor, wherein the storage cell has a capacity for being charged;

a regenerative brake, wherein the motor acts as a dynamo when the electric vehicle is decelerated;

regenerative determining means for determining if the storage cell is less than the capacity for being charge, wherein when the storage cell is less than the capacity for being charged as determined by said regenerative determining means, the storage cell is charged by the motor when the motor acts as the dynamo when the electric vehicle is decelerated; and a motor driving circuit for controlling said motor, wherein said motor driving circuit comprises power consuming means for consuming power produced by the motor when the motor acts as the dynamo when the electric vehicle is decelerated, when the storage cell exceeds than the capacity for being charged as determined by said regenerative determining means, said motor driving circuit comprising at least one transistor having a gate, a source and a drain, wherein when said storage cell cannot be charged as determined by said regeneration determining means, said at least one transistor is turned on and further a gate voltage applied to said gate is adjusted to change an on-resistance between said source and drain to control the regenerated electric power.

* * * * *

UNITED STATES PATENT AND TRADEMARK OFFICE
CERTIFICATE OF CORRECTION

PATENT NO.     : 6,011,378
DATED          : January 4, 2000
INVENTOR(S)    : Kunio Tabata, et al.

It is certified that errors appear in the above identified patent and that said Letters Patent is hereby corrected as shown below:

Title page, item 56, References Cited:

insert --4,313,080  1/1982  Park 4,691,148  9/1987  Nicholls, et al.

5,384,522  1/1995  Toriyama, et al.

5,504,415  4/1996  Podrazhansky, et al.

5,771,475  6/1998  Tabata, et al.--

Column 17, line 51, change "though" to --through--.
　　　　　line 53, change "chain" to --drain--.

Column 18, line 22, change "controlls" to --controls--.
　　　　　line 36, change "charge" to --charged--.

Signed and Sealed this

Twenty-seventh Day of March, 2001

Attest:

NICHOLAS P. GODICI

Attesting Officer

*Acting Director of the United States Patent and Trademark Office*